United States Patent [19]
Takahashi

[11] Patent Number: 5,786,588
[45] Date of Patent: Jul. 28, 1998

[54] PHOTOELECTRIC CONVERSION APPARATUS HAVING AN IMPROVED ARRANGEMENT OF PIXEL OUTPUT

[75] Inventor: Hidekazu Takahashi, Isehara, Japan

[73] Assignee: Canon Kabushiki Kaisha, Tokyo, Japan

[21] Appl. No.: 690,936

[22] Filed: Aug. 1, 1996

[30] Foreign Application Priority Data

Aug. 2, 1995 [JP] Japan ................................. 7-197470

[51] Int. Cl.$^6$ ................................................. H01J 40/14
[52] U.S. Cl. ...................... 250/208.1; 250/226; 348/273
[58] Field of Search ............................. 250/208.1, 226, 250/214 R; 348/273, 279, 272, 223, 242; 355/32, 88; 356/416, 419

[56] References Cited

U.S. PATENT DOCUMENTS

| | | | |
|---|---|---|---|
| 4,567,510 | 1/1986 | Tanaka et al. | 348/273 |
| 4,962,412 | 10/1990 | Shinohara et al. | 257/53 |
| 5,060,042 | 10/1991 | Shinohara et al. | 257/290 |
| 5,115,302 | 5/1992 | Watanabe | 348/279 |
| 5,541,648 | 7/1996 | Udagawa et al. | 348/279 |

FOREIGN PATENT DOCUMENTS 63-186466  2/1988  Japan.

*Primary Examiner*—Que Le
*Attorney, Agent, or Firm*—Fitzpatrick,Cella, Harper & Scinto

[57] ABSTRACT

There is disclosed an XY-addressable photoelectric conversion apparatus capable of always providing the output signal of a same color from each of the output terminals. The apparatus is provided with four color filters A, B, C and D in a mosaic array on the pixels, wherein the color filters are arranged in a unit array of 4 lines and 4 columns and in a pattern of ABAB, CDCD, ABAB and DCDC from the first to fourth lines, and the pixels corresponding to the color filters are read for each column, with a displacement of the pixels of the second or fourth line by a column. Also the color filters in the unit array of 4 lines and 4 columns are complementary color mosaic filters.

10 Claims, 7 Drawing Sheets

FIG.2

| Cy | Ye |
|----|----|
| Mg | G  |
| Cy | Ye |
| G  | Mg |

PHOTOELECTRIC CONVERSION APPARATUS HAVING AN IMPROVED ARRANGEMENT OF PIXEL OUTPUT

BACKGROUND OF THE INVENTION

1. Field of the Invention

The present invention relates to an XY-addressable photoelectric conversion apparatus composed for example of BASIS, MOS or SIT and bearing color filters thereon.

2. Related Background Art

Among the conventional XY-addressable area sensors, there is already known a BASIS (base stored image sensor) area sensor, which is detailedly disclosed in the Japanese Patent Application Laid-open No. 63-186466.

FIG. 8 is an equivalent circuit diagram of a photoelectric conversion apparatus utilizing BASIS as the color image sensor, wherein shown are a bipolar phototransistor 1 receiving photons at the base thereof; a resetting PMOS transistor 2; a control capacitance 3 (COX) for controlling the base potential; an emitter output line 4; a vertical output line 5; a horizontal drive line 6; a resetting MOS transistor 7 for the vertical output line 5; a transferring MOS transistor 8; an accumulating capacitance 9 (CT) for accumulating the photo-induced charge of the bipolar phototransistor 1; a transfer MOS transistor 10 to the horizontal output line; a horizontal output line 11; a resetting MOS transistor 12 for the horizontal output line 11; an output amplifier 13 for amplifying the signal of the horizontal output line; a horizontal scanning circuit 14 for scanning the signals transferred to the horizontal output line 11; and a vertical scanning circuit 15 for activating the horizontal drive lines 6. On the pixels, particularly on the bases of the phototransistors 1, there are provided on-chip mosaic filters of complementary colors Cy, Mg, G and Ye. In the above-explained circuit, by driving two lines at the same time, there is executed a read-out operation for the four vertical columns, thereby achieving very fast read-out. For example in the use an photoelectric conversion apparatus for the NTSC television system, there are obtained following outputs at output terminals OUT1-OUT4:

| Horizontal scanning period | 1H | 2H | 3H | 4H |
| --- | --- | --- | --- | --- |
| OUT 1 | Cy → | Cy → | Cy → | Cy → |
| OUT 2 | Mg → | G → | Mg → | G → |
| OUT 3 | G → | Mg → | G → | Mg → |
| OUT 4 | Ye → | Ye → | Ye → | Ye → | so that line sequential readout of the color difference signals can be achieved by the additions OUT1+OUT2 and OUT3+OUT4.

Such method is employed in the ordinary television scanning, as it is superior in the dynamic resolution, indicating the resolution when the object is moving, and in the S/N ratio (signal-to-noise ratio).

Such conventional configuration, though effective in the present analog television system, however results in certain drawbacks in the application to the multimedia, principally employing the digital process. For the area sensor for the multimedia, there is desired a two-line simultaneous all pixel output system, since the line-sequential color difference system is inferior in the vertical resolution. However, if such output method is employed in the conventional area sensor, there will result:

a) color inversion of the outputs OUT2 and OUT3 in every 1H; and b) lack of uniformity in the color outputs in the interlaced and non-interlaced signals, whereby the signal processing circuit after the photoelectric conversion apparatus becomes complex and expensive.

SUMMARY OF THE INVENTION

In consideration of the foregoing, the object of the present invention is to always provide an output of a same color in each of the output terminals OUT1–OUT4, while employing the conventional arrangement of the color filters.

The above-mentioned object can be attained, according to the present invention, by an XY-addressable area sensor in which the spatial phase of the color filter array is displaced by a half cycle between an n-th horizontal line and an (n+2)-th horizontal line, wherein the output line of each of the pixels in the n-th or (n+2)-th horizontal line is connected to a vertical output line of a horizontally adjacent pixel.

The above-explained configuration provides color output of a same phase, since the outputs of pixels of a line of which color filters are displaced by a half cycle are displaced by a half cycle. Consequently each output terminal always provides the color signal of a same color, regardless of the driving method such as interlaced or non-interlaced drive.

The present invention is also featured by an XY-addressable photoelectric conversion apparatus bearing a mosaic array of four color filters A, B, C and D on the pixels, wherein such color filters are arranged in the unit of 4 lines and 4 columns and in a pattern of ABAB, CDCD, ABAB and DCDC from the first to fourth lines, and the pixels of the second or fourth line are displaced by a pixel in the readout of each column of the pixels corresponding to such color filters.

The present invention is further featured by an XY-addressable photoelectric conversion apparatus bearing a mosaic array of four color filters A, B, C and D on the pixels, wherein such color filters are arranged in the unit of 4 lines and 4 columns and in a pattern of ABAB, CDCD, BABA and DCDC, and the pixels of the third and fourth lines are displaced by a pixel, with respect to those of the first and second lines, in the readout of each column of the pixels corresponding to such color filters. In this manner it is rendered possible, in the photoelectric conversion apparatus utilizing a color filter array in the unit of 4 lines and 4 columns and corresponding pixels, to obtain an output signal of each color through the vertical and horizontal scanning circuits, thereby obtaining image signal of a high resolution not only for a still image but also for a dynamic image without complication in the signal processing circuit employed after the photoelectric conversion apparatus.

Other objects of the present invention, and the features thereof, will become fully apparent from the following description which is to be taken in conjunction with the attached drawings.

BRIEF DESCRIPTION OF THE DRAWINGS

Figure 2:
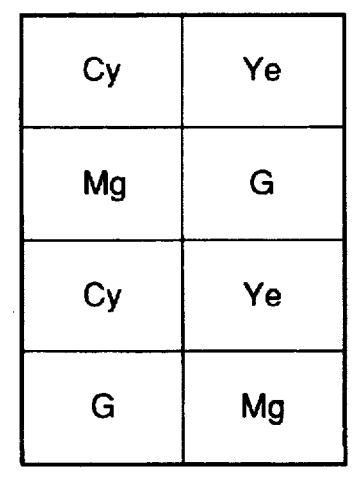

FIG. 2 is a view showing the color filter arrangement in the first embodiment of the present invention;

DETAILED DESCRIPTION OF THE PREFERRED EMBODIMENTS

Now the present invention will be clarified in detail by preferred embodiments thereof, with reference to the attached drawings.

Figure 1:
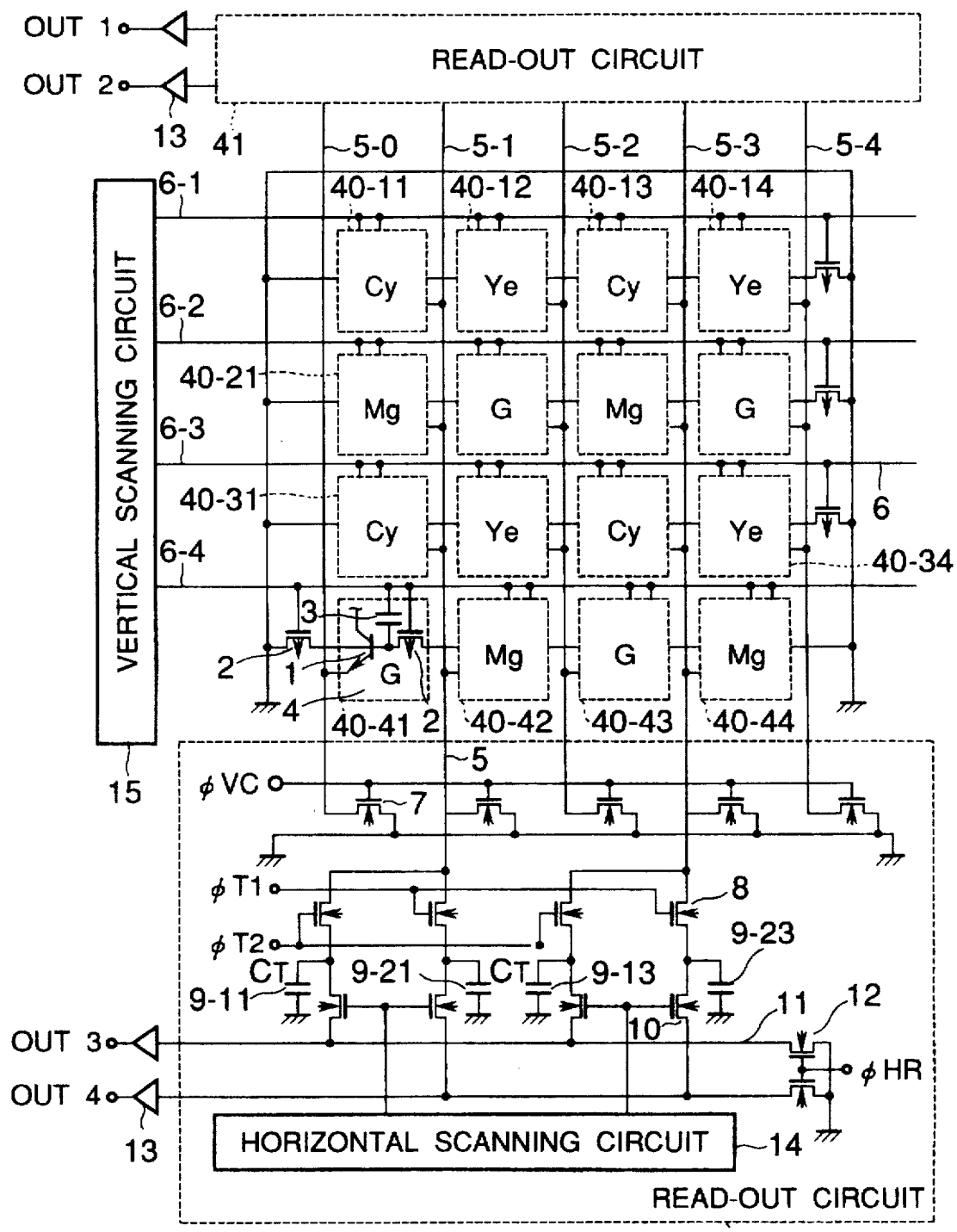
FIG. 1 is a schematic circuit diagram of a first embodiment of the present invention.

FIG. 1 is a schematic circuit diagram of a first embodiment of the present invention, wherein shown are a bipolar phototransistor 1 for receiving photons at the base thereof; a resetting PMOS transistor 2; a control capacitance 3 (COX) for controlling the base potential; an emitter output line 4; a vertical output line 5; a horizontal drive line 6; a resetting NMOS transistor 7 for the vertical output line; a transfer NMOS transistor 8 for transferring the photon-induced charge; an accumulating capacitance 9 (CT) for temporarily accumulating the photon-induced charge; a transferring NMOS transistor 10 for transferring the charge of the accumulating capacitance CT 9; a horizontal output line 11; an NMOS transistor 12 for grounding the horizontal output line; an output amplifier 13; a horizontal scanning circuit 14; a vertical scanning circuit 15; an XY-addressable pixel 40 including the bipolar phototransistor 1, the resetting PMOS transistor 2 and the base potential controlling capacitance COX 3 mentioned above; and a readout circuit 41 including the horizontal scanning circuit 14. It is to be noted that, in the horizontal drive line 6-4 among the horizontal drive lines 6, the emitters of the bipolar phototransistors 1 are respectively connected to the horizontally adjacent vertical output lines 5.

The function of the above-explained photoelectric conversion apparatus will be briefly explained in the following. At first a low-level pulse is supplied from the vertical scanning circuit 15 to the horizontal drive line 6-1 to render the PMOS transistors 4 of the pixels 40-11–40-14 conductive, thereby resetting the bases of the phototransistors 1 of this drive line to the ground level. Then a control pulse φVC is shifted to a high level to reset the vertical output lines. Also a control pulse φHR is shifted to a high level to reset the horizontal output line 11. Subsequently photoinduced charges corresponding to the object image are accumulated in the bases of the phototransistors 1. After the lapse of a predetermined time, a high level pulse is supplied to the horizontal drive line 6-1 to elevate the potentials of the bases of the phototransistors 1 through the control capacitances COX 3 connected to the horizontal drive line 6-1, thereby activating the phototransistors 1 and outputting the photoinduced charges to the emitters thereof. Then a control pulse φT1 is shifted to a high level to render the transfer NMOS transistors 8 conductive, thereby accumulating the photo-induced charges in the accumulating capacitances CT. Also a control pulse φT2 is shifted to a high level to render the transfer NMOS transistors 8 conductive, thereby accumulating the photoinduced charges in the accumulating capacitances CT. Then predetermined scanning pulses are supplied from the horizontal scanning circuit 14 to render the transfer NMOS transistors 10 conductive, whereby the image signals are released from output terminals OUT1–OUT4, through the horizontal output lines 11 and after amplification to a predetermined level by the output by the output amplifiers 13. The control pulses φVC, φT1, φT2, φHR and the pulses from the horizontal scanning circuit 14 are similarly supplied also to an upper readout circuit shown in FIG. 1.

The pixels are of mutually same characteristics, but are provided thereon with color filters of complementary colors as illustrated. Thus, on the vertical output line 5-1, the photoinduced charge of the pixel 40-11 (Cy) is transferred to the lower accumulating capacitance 9-11. Also the photoinduced charge of the pixel 40-12 (Ye) is transferred to the upper accumulating capacitance 9-12, that of the pixel 40-13 (Cy) is transferred to the lower accumulating capacitance 9-13, and that of the pixel 40-14 (Ye) is transferred to the upper accumulating capacitance 9-14. Then, when the next horizontal drive line 602 is similarly activated, the photoinduced charge of the pixel 40-21 (Mg) is transferred to the lower accumulating capacitance 9-21, that of the pixel 40-22 (G) is transferred to the upper accumulating capacitance 9-22, and that of the pixel 40-23 (Mg) is transferred to the lower accumulating capacitance 9-23. In this manner the photo-induced charges are transferred in succession to the accumulating capacitances, and, in response to the scanning pulses from the horizontal scanning circuit 14, the amplified photoinduced charges of the pixels 40-11 (Cy), 40-21 (Mg), 40-12 (Ye) and 40-22 (G) are respectively released from the output terminals OUT3, OUT4, OUT1 and OUT2. Subsequently the output terminal OUT3 provides the Cy component of the amplified photoinduced charge, and the output terminals OUT4, OUT1 and OUT2 respectively provide the Mg, Ye and G components.

As the connections of the pixels of the fourth horizontal drive line 604 are displaced by a pixel, the G pixel signals are released from the vertical output lines 5-0, 5-2, . . . Also the G and Ye pixel signals are obtained from the upper readout circuit 41. Consequently the Mg and G components of the photoinduced charges are respectively obtained from the output terminals OUT4 and OUT2, as explained above.

The pixels are provided thereon with on-chip filters of complementary colors for XY addressing, in a mosaic array in the unit of 4 lines and 4 columns. Such complementary mosaic filters are formed on a wafer in the formation of the photoelectric conversion apparatuses, and each chip of the photoelectric conversion apparatus is divided afterwards from such wafer. The mosaic filters consist of cyan (Cy), yellow (Ye), magenta (Mg) and green (G) elements. Each line is composed of a repeating pattern of cyan (Cy) and yellow (Ye) elements or of magenta (Mg) and green (G) elements. In this embodiment, the first and third lines, consisting of the cyan (Cy) and yellow (Ye) elements are of a same layout, but the second and fourth lines, consisting of the magenta (Mg) and green (G) elements, are mutually displaced by a pixel. This is to displace the G filters, having the largest weight in the luminance signal in consideration of the human sight, by a half cycle, thereby improving the dynamic resolution. This is in fact the optimum color filter arrangement, employed most commonly, since color difference signals can also be obtained by simultaneous readout of two lines in case of the line-sequential color difference signal system.

Figure 3:
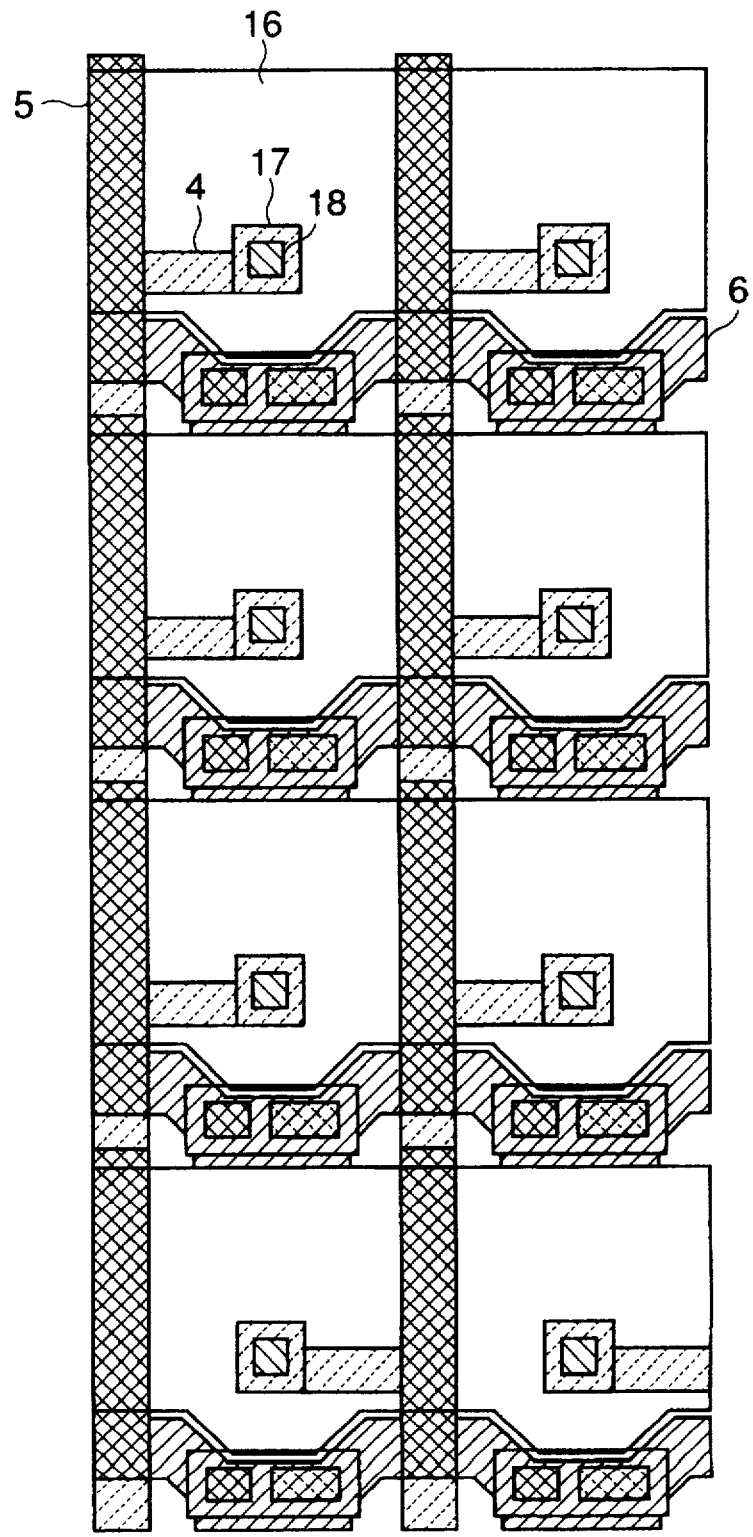
FIG. 3 is a plan view of pixel areas in the first embodiment of the present invention.

FIG. 3 is a plan view of the pixel area of an area sensor embodying the present invention. The actual area sensor in composed of several ten thousand to several million pixels, by repeating the illustrated unit of 8 pixels in the horizontal and vertical directions. In FIG. 3 there are shown a base 16 of an npn phototransistor, an emitter 17 thereof, and a contact 18 between the emitter and the output line. There are also shown, as shown in FIG. 1, an emitter output line 4 of the phototransistor 1, a vertical output line 5, and a horizontal drive line 6. The light from the object image received by the base 16, having a large area effective for photoelectric conversion, of the phototransistor 1, and, in response to the activation by the horizontal drive line 6, the photoinduced charge is transferred through the emitter 17, the output line 4 and the vertical output line 5. Then the color signals are obtained from the output terminals OUT1–OUT4, by the function of the readout circuit 41, provided in the peripheral area of the chip and including the accumulating capacitances 9, the horizontal scanning circuit 14 etc.

The present embodiment is featured by a fact that the output lines of the pixels of the fourth line are connected to the respectively adjacent vertical output lines. In the conventional configuration, the G output of the second line and the Mg output of the fourth line are connected to a same vertical output line, but, in the present embodiment, the G pixels of the second and fourth lines are connected to a same vertical output line, so that each output terminal can always provide the signal of a same color in the all-pixel independent readout drive.

In the present embodiment, each of the output terminals OUT1–OUT4 always provides the signal of a same color, as shown in the following:

| Horizontal synchronization period | 1H | 2H | 3H | 4H | 5H |
| --- | --- | --- | --- | --- | --- |
| OUT1 | Ye → | Ye → | Ye → | Ye → | Ye → |
| OUT2 | G → | G → | G → | G → | G |
| OUT3 | Cy → | Cy → | Cy → | Cy → | |
| OUT4 | Mg → | Mg → | Mg → | Mg → | |

As explained in the foregoing, the present embodiment allows to provide the signal of a same color from each of the output terminals, while maintaining the arrangement of the complementary mosaic color filters in the visually optimum state, thereby enabling to simplify the signal processing circuit without any deterioration in the S/N ratio and in the dynamic resolution. Also the precision of automatic white balancing can be improved, as the arrangement of the complementary color mosaic filters is maintained as explained above.

Figure 4:
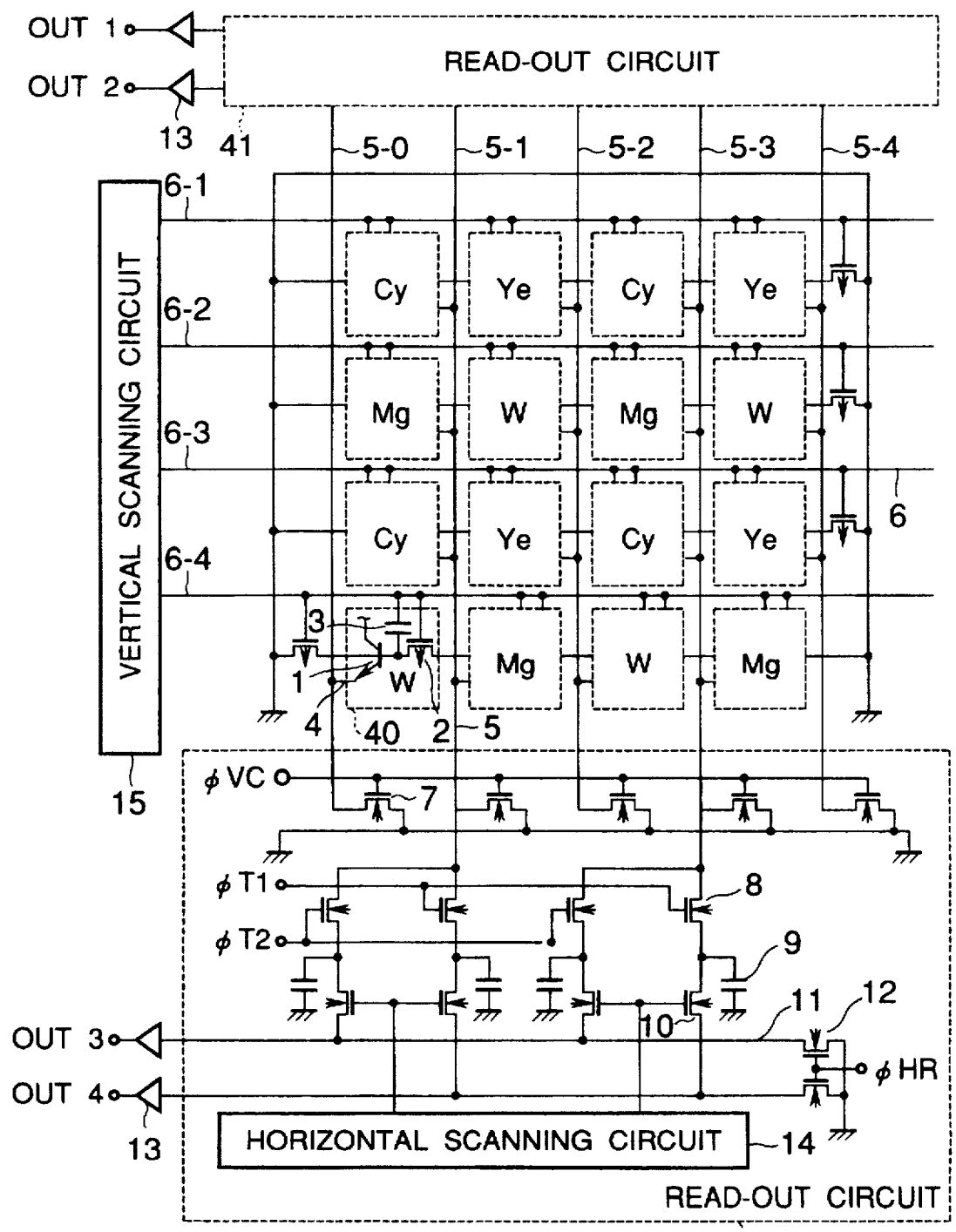
FIG. 4 is a schematic circuit diagram of a second embodiment of the present invention.

FIG. 4 is a schematic equivalent circuit diagram of a second embodiment of the present invention. In this embodiment, the green (G) filters are replaced by white (W) filters, for achieving an improvement in the sensitivity, based on the difference in the optical transmittance. In the present embodiment, the W and Mg filters are displaced by a half cycle, and the emitter output lines of the pixels corresponding to such displaced filters are connected to the respectively adjacent output lines. The signal processing circuit can be simplified also in this embodiment.

The signal output operations of the pixels in FIG. 4 are same as those in FIG. 1, and each of the output terminals OUT1–OUT4 always provides the signal of a same color, as shown in the following:

| Horizontal syncronization period | 1H | 2H | 3H | 4H | 5H |
| --- | --- | --- | --- | --- | --- |
| OUT1 | Ye → | Ye → | Ye → | Ye → | Ye → |
| OUT2 | W → | W → | W → | W → | W |
| OUT3 | Cy → | Cy → | Cy → | Cy → | |
| OUT4 | Mg → | Mg → | Mg → | Mg → | |

As in the first embodiment, this embodiment allows to provide the image signal of a same color at each output terminal. Also the output terminal OUT2 provides a white signal, in addition to the complementary color signals of yellow, cyan and magenta, so that the transmission process becomes simple and effective for a color signal system in which the signal transmission is divided into an axis-I of orange-cyan color and an axis-Q of green-magenta color.

Figure 5:
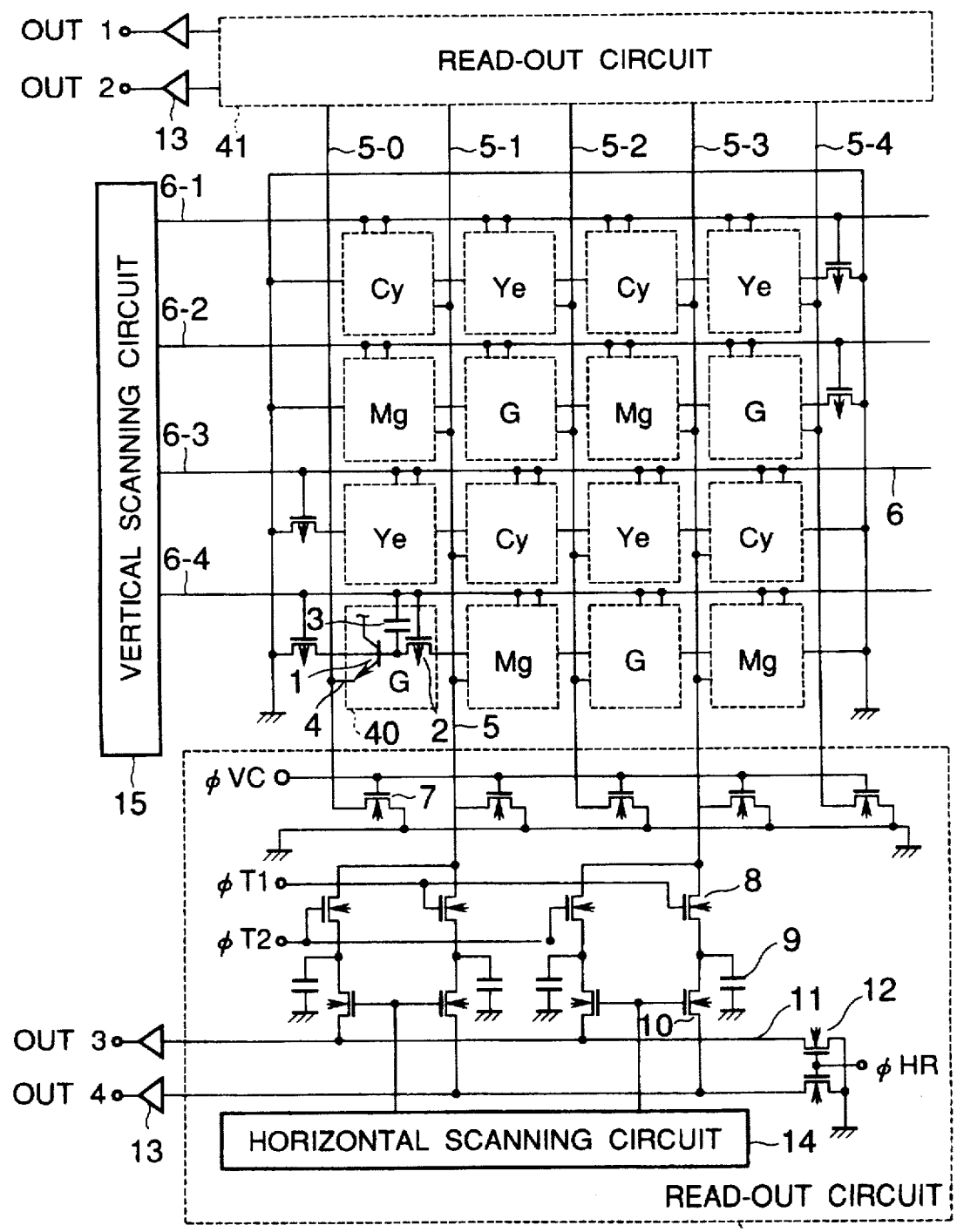
FIG. 5 is a schematic circuit diagram of a third embodiment of the present invention.

FIG. 5 is a schematic equivalent circuit diagram of a third embodiment of the present invention, which is featured by a fact that the color filter arrangement in the first and second lines 6-1, 6-2 are displaced by a half cycle, or by a pixel, with respect to that of the third and fourth lines 6-3, 6-4. In the present embodiment, since Cy+Mg=R+G+2B and Ye+G=R+2G, there is generated only one color difference 2B–G, so that it is difficult to achieve line-sequential color difference drive. However, with the above-explained mosaic arrangement of the color filters improves the color resolving power, thereby improving the resolution in comparison with the conventional configuration.

Referring to FIG. 5, the Ye and G pixels are respectively output from OUT1 and OUT2, through the vertical output lines 5-0, 5-2, . . . and the upper readout circuit 41, while the Cy and Mg pixels are respectively output from OUT3 and OUT4, through the vertical output lines 5-1, 5-3, . . . and the lower readout circuit 41. Since the Cy and Ye pixels, in addition to the Mg and G pixels, are displaced by one pixel from the basic pattern, there is achieved an improvement in the dynamic resolution, for the movement of the object. In this case, pattern layout of a complementary color mosaic filter on the pixel of the basic pattern is formed similarly to the pattern of the pixels 40.

Figure 6:
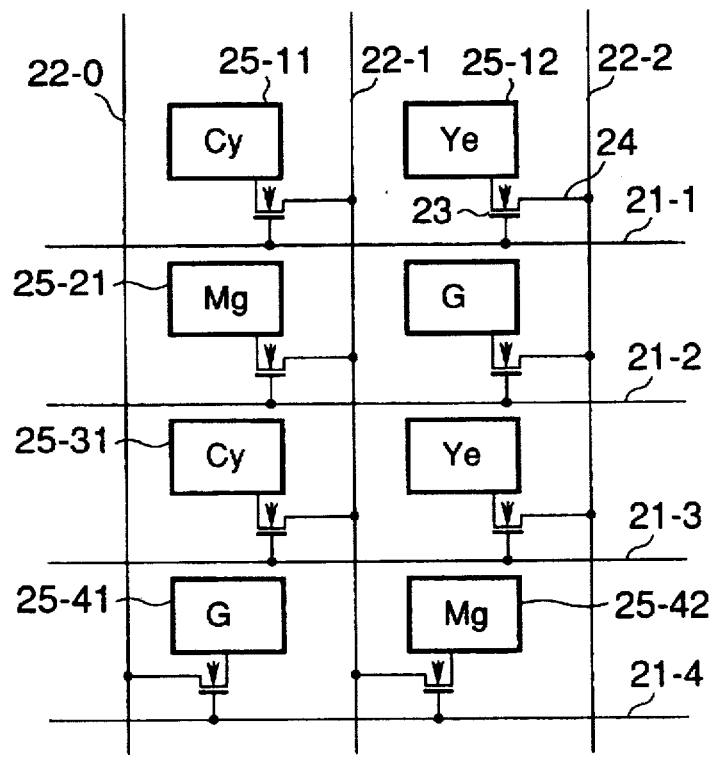
FIG. 6 is a schematic circuit diagram of a fourth embodiment of the present invention.

FIG. 6 is a circuit diagram of a fourth embodiment of the present invention, applied to a CMOS process compatible area sensor instead of the BASIS area sensor. In FIG. 6 there are shown horizontal drive lines 21; vertical output lines 22; pixel output selection MOS switches 23; pixel output lines 24; and pixels 25. The pixels are provided thereon with complementary color mosaic filters, and the pixels 25-41, 25-42, . . . connected to the horizontal drive line 21-4 are displaced, by a pixel, from those connected to the horizontal drive line 21-2.

Figure 7A:
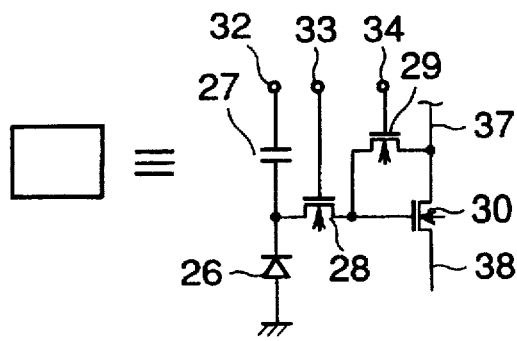
FIGS. 7A and 7B are views showing the color filter arrangement in fourth and fifth embodiments of the present invention.

FIG. 7A is a circuit diagram of a pixel 25, wherein shown are a photoelectric conversion unit 26 composed of a photodiode; a photogate capacitance 27; a transfer NMOS transistor 28; a resetting NMOS transistor 29; and an amplifying NMOS transistor 30. The photoelectric conversion unit 26 is a depletion layer formed by the potential of the photogate capacitance 27, and the above-mentioned potential is controlled by a voltage controlling pulse 32 applied to the photogate capacitance 27.

In the above-explained circuit, at first a control pulse 34 is shifted to a high level to render the resetting NMOS transistor 29 conductive, thereby resetting the gate of the amplifying NMOS transistor 30 to the power supply line 37. Then a control pulse 32 is shifted to a high level to activate the photoelectric conversion unit 26. Then a control pulse 33 is shifted to a high level state to render the transfer NMOS transistor 28 conductive, thereby transferring the photoinduced charge, accumulated in the photoelectric conversion unit 26 according to the amount of light received from the object image, to the gate of the amplifying NMOS transistor 30. The charge is amplified by the transistor 30 and released to the vertical output line 22, through the pixel output selection MOS switch 23 connected to the output line 38 and the pixel output line 24. Thereafter the image signals of the pixels are released by a scanning operation as in the readout circuit 41 shown in FIG. 1.

It is also possible in the present embodiment to replace the green (G) pixels with the white (W) pixels as in the second embodiment, and to displace the pixels of the third and fourth horizontal drive lines by a pixel, with respect to those of the first and second horizontal drive lines, as in the third embodiment.

The present embodiment enables, also in a sensor in which the pixel units and the peripheral circuits are formed by a same CMOS process, to effect outputs of constant colors independently for all the pixels, by displacing the pixel wirings of a line within the unit pixel pattern by a pixel, without any change in the original pattern of the complementary color mosaic filters. Also the output image signal, being amplified by a MOS transistor within the pixel, becomes a high level, thus providing a high S/N ratio.

Figure 7B:
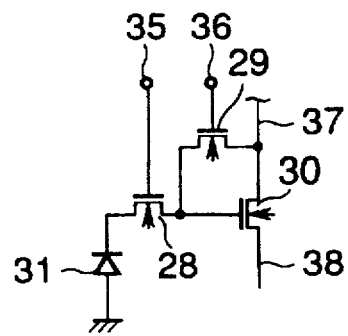
Figure 8:
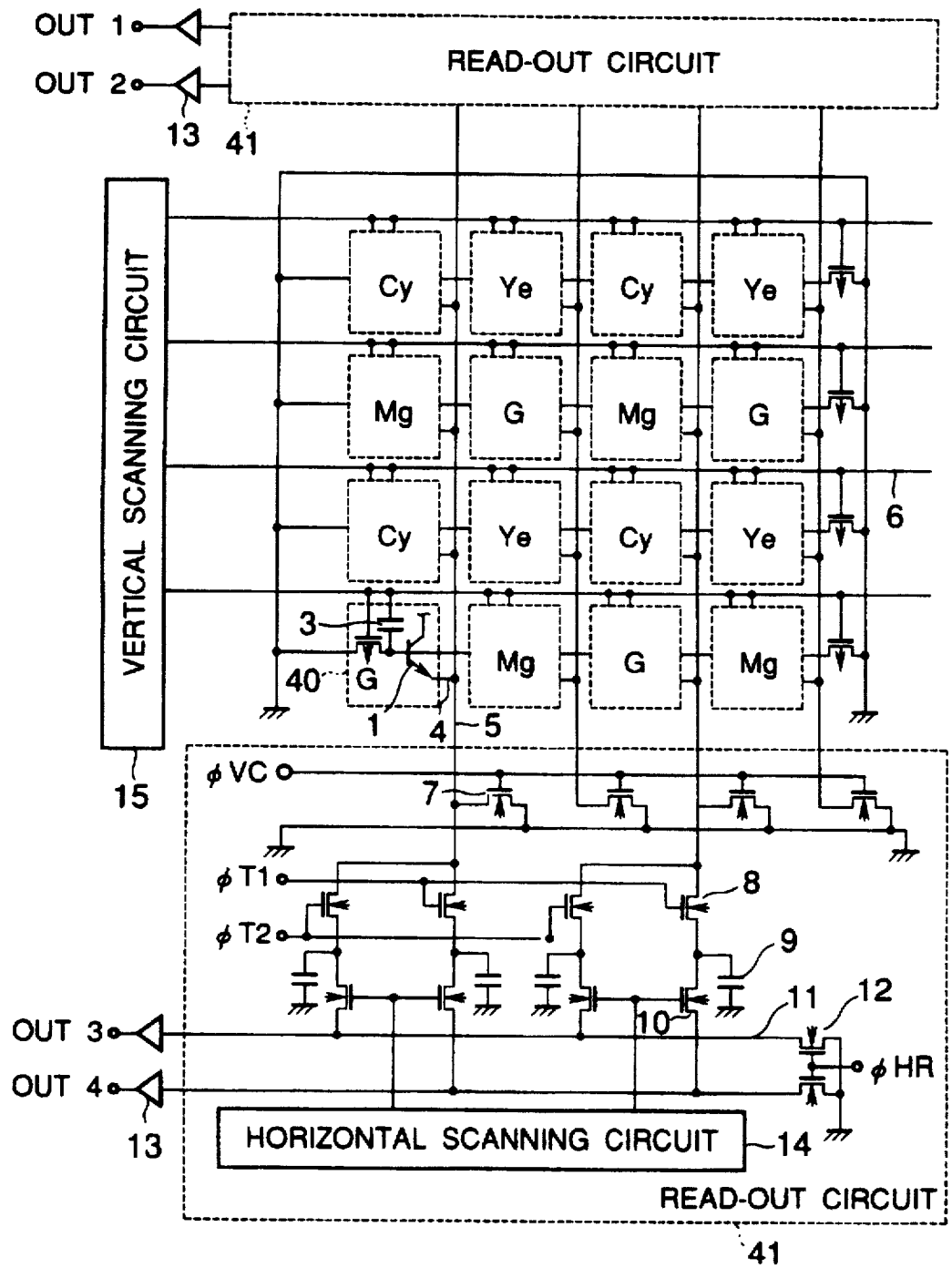
FIG. 8 is a schematic equivalent circuit diagram of a conventional solid-state image pickup apparatus.

FIG. 7B is a circuit diagram showing the configuration of a fifth embodiment of the present invention, which is featured by a fact that the photogate 27 and the photoelectric conversion area 26, composed of a depletion layer, in the fourth embodiment are replaced by a PN photodiode 31. Also in this embodiment, the readout of all the pixels with constant colors can be achieved merely by a change in the wirings of the pixel output lines.

In the circuit shown in FIG. 7B, a control pulse 36 is shifted to a high level state to render the resetting NMOS transistor 29 conductive, thereby resetting the gate of the amplifying NMOS transistor 30 to the power supply line 37. At the same time a photoinduced charge is generated in the PN photodiode 31, corresponding to the amount of light from the object image. Then a control pulse 35 is shifted to a high level state to render the transfer NMOS transistor 28 conductive, thereby transferring the photoinduced charge of the PN photodiode 31 to the gate of the amplifying NMOS transistor 30. The photoinduced charge is amplified by the transistor 30 and output to the vertical output line 22, through the pixel output selection MOS switch 23 connected to the output line 38 and the pixel output line 24. Thereafter the image signals of the pixels are output by a scanning operation as in the readout circuit 41 in FIG. 1.

Also in this embodiment, there is naturally applicable a pixel pattern as in the second or third embodiment.

The foregoing first to fifth embodiments have been explained by BASIS and CMOS-compatible sensors, but the present invention is naturally applicable also to any other XY-addressable sensors such as SIT, CMD and JFET sensors.

As explained in the foregoing, the present invention allows to provide the image signal of a same color from each of the output terminals even with the complementary color mosaic filters designed for improving the dynamic resolution and regardless of the driving method of the horizontal and vertical scanning circuits, thereby enabling to simplify the signal processing circuit to be used after the photoelectric conversion apparatus and to improve the precision of auto white balancing. Also the output signal of a same color can always be obtained at each of the output terminals, without any change in the filter arrangement, and the image signal of a high S/N ratio can be obtained by employing an amplifying transistor for the pixel output.

Many widely different embodiments of the present invention may be constructed without departing from the spirit and scope of the present invention. It should be understood that the present invention is not limited to the specific embodiments described in the specification, except as defined in the appended claims.

What is claimed is:

1. An XY-addressable photoelectric conversion apparatus for reading charges, obtained by photoelectric conversion with four color separation filters, from pixels including photoelectric conversion units to a plurality of vertical output lines, comprising:

a color filter array of four color filters A, B, C and D arranged in an alternate array of A, B, A, B, ... on the pixels of a first horizontal line, in an alternate array of C, D, C, D, ... on the pixels of a second horizontal line, in an alternate array of A, B, A, B, ... on the pixels of a third horizontal line, in an alternate array of D, C, D, C, ... on the pixels of a fourth horizontal line, and arranged thereafter in the repetition of said four lines on the remaining pixels, wherein outputs of said pixels on said second horizontal line and said fourth horizontal line are connected to respectively adjacent ones of said vertical output lines, such that the charge of a pixel on which there is a D filter on said second horizontal line and the charge of a pixel on which there is a D filter on said fourth horizontal line are output to a same one of said vertical output lines.

2. A photoelectric conversion apparatus according to claim 1, wherein, among said four color filters, C or D is green and other color filters are of complementary colors of cyan, magenta and yellow.

3. A photoelectric conversion apparatus according to claim 1, wherein a photoelectric conversion element in said photoelectric conversion unit is a bipolar transistor.

4. A photoelectric conversion apparatus according to claim 1, wherein a photoelectric conversion element in said photoelectric conversion unit is a MOS transistor.

5. A photoelectric conversion apparatus according to claim 1, wherein a photoelectric conversion element in said photoelectric conversion unit is a PN photodiode.

6. An XY-addressable photoelectric conversion apparatus having a matrix of pixels and four color filters A, B, C and D in a mosaic array on the pixels, wherein said color filters are arranged on said pixels in a unit array of 4 lines and 4 columns and in a pattern of ABAB, CDCD, ABAB and DCDC from the first to fourth lines, and the pixels corresponding to said color filters are read vertically, wherein, in a same vertical read, the pixel read in a selected one of said second line and said fourth line is offset from the pixels read in the remaining three lines by one column.

7. A photoelectric conversion apparatus according to claim 6, wherein said color filters arranged in the unit array of 4 lines and 4 columns are complementary color mosaic filters.

8. A photoelectric conversion apparatus according to claim 6, wherein said four color filters A, B, C and D are yellow, cyan, magenta and green.

9. A photoelectric conversion apparatus according to claim 6, wherein said four color filters A, B, C and D are yellow, cyan, magenta and white.

10. An XY-addressable photoelectric conversion apparatus having a matrix of pixels and at least four color filters A, B, C and D in a mosaic array on the pixels, wherein said color filters are arranged on said pixels in a unit array of 4 lines and 4 columns and in a pattern of ABAB, CDCD, BABA and DCDC from the first to fourth lines, and the pixels corresponding to said color filters are read vertically, wherein, in a same vertical read, the pixels read in said third and fourth lines are offset by one column with respect to the pixels read in said first and second lines.

* * * * *

UNITED STATES PATENT AND TRADEMARK OFFICE
CERTIFICATE OF CORRECTION

PATENT NO. : 5,786,588
DATED : July 28, 1998
INVENTOR(S) : HIDEKAZU TAKAHASHI

It is certified that error appears in the above-identified patent and that said Letters Patent is hereby corrected as shown below:

ON COVER PAGE AT [56], ATTORNEY, AGENT OR FIRM

"Fitzpatrick,Cella, Harper & Scinto" should read
--Fitzpatrick, Cella, Harper & Scinto--.

COLUMN 1

Line 37, "example" should read --example,-- and
"use an" should read --use of a--.

COLUMN 3

Line 42, "40-11–40-14" should read --40-11 – 40-14--.

COLUMN 4

Line 32, "5-2,...Also" should read --5-2,... Also--;
Line 61, "in" should read --is--.

Signed and Sealed this

Twenty-second Day of June, 1999

Attest:

Q. TODD DICKINSON

Attesting Officer

Acting Commissioner of Patents and Trademarks